(12) United States Patent
Kim et al.

(10) Patent No.: US 12,095,022 B2
(45) Date of Patent: Sep. 17, 2024

(54) SECONDARY BATTERY AND METHOD OF MANUFACTURING THE SAME

(71) Applicant: SAMSUNG ELECTRONICS CO., LTD., Suwon-si (KR)

(72) Inventors: Jirae Kim, Seoul (KR); Dooyeon Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/523,172

(22) Filed: Nov. 10, 2021

(65) Prior Publication Data

US 2022/0166049 A1 May 26, 2022

(30) Foreign Application Priority Data

Nov. 20, 2020 (KR) .................. 10-2020-0156927

(51) Int. Cl.
*H01M 4/70* (2006.01)
*H01M 10/04* (2006.01)

(52) U.S. Cl.
CPC ......... *H01M 10/0427* (2013.01); *H01M 4/70* (2013.01)

(58) Field of Classification Search
CPC ............................ H01M 10/0427; H01M 4/70
See application file for complete search history.

(56) References Cited

U.S. PATENT DOCUMENTS

2018/0287145 A1* 10/2018 Lee ................... H01M 4/366
2019/0348702 A1* 11/2019 Zhu ................... H01M 50/375
2020/0067141 A1   2/2020 Morita
2020/0328416 A1* 10/2020 Sahin ................. H01M 4/623

FOREIGN PATENT DOCUMENTS

| CN | 102263256 A | * | 11/2011 | |
| JP | 2005100926 A | * | 4/2005 | ......... H01G 9/155 |
| KR | 100393484 B1 | | 8/2003 | |
| KR | 100439739 B1 | | 7/2004 | |
| KR | 101404758 B1 | | 6/2014 | |

OTHER PUBLICATIONS

Google English Machine Translation of JP 2005100926, originally published to Hiroyuki Kamisuke on Apr. 14, 2005 (Year: 2005).*
EPO English Machine Translation of CN 102263256, originally published to Kong Lingkun on Nov. 30, 2011 (Year: 2011).*
Google English Machine Translation of KR 2002088469 originally published to Kim Yeong Deok on Nov. 29, 2002 (Year: 2002).*
Vivian Murray et al., "A Guide to Full Coin Cell Making for Academic Researchers," Journal of the Electrochemical Society, Jan. 30, 2019, pp. A329-A333, vol. 166, vol. 2.

* cited by examiner

*Primary Examiner* — Cynthia H Kelly
*Assistant Examiner* — Niara Trant
(74) *Attorney, Agent, or Firm* — CANTOR COLBURN LLP

(57) ABSTRACT

A secondary battery includes: an anode including an anode active material on an anode active material support; a cathode including a cathode active material on a cathode active material support; a separator between the anode and the cathode; an anode guide extending in a first direction from a first region along an edge of the anode active material support; and a cathode guide extending in a second direction from a second region along an edge of the cathode active material support.

19 Claims, 19 Drawing Sheets

SECONDARY BATTERY AND METHOD OF MANUFACTURING THE SAME

CROSS-REFERENCE TO RELATED APPLICATION

This application is based on and claims priority under 35 U.S.C. § 119 to Korean Patent Application No. 10-2020-0156927, filed on Nov. 20, 2020, in the Korean Intellectual Property Office, and all the benefits accruing therefrom under 35 U.S.C. § 119, the content of which in its entirety is herein incorporated by reference.

BACKGROUND

1. Field

The present disclosure relates to secondary batteries in which an anode electrode, a separator, and a cathode electrode are stacked, and methods of manufacturing the secondary batteries.

2. Description of the Related Art

A secondary battery, unlike a primary battery, is a battery that may repeatedly perform charging and discharging operations. A small-capacity secondary battery may be used in portable small electronic devices, such as mobile phones, notebook computers, and camcorders.

Demand for a secondary battery having a high-power output has increased. A high-power output secondary battery may be configured such that anodes, separators, and cathodes are sequentially stacked multiple times.

Sizes of the anode, the separator, and the cathode used in a secondary battery may be different from each other. Depending on the stacking method, the alignment of the anode, the separator, and the cathode may be misaligned, and as charging and discharging operations of the secondary battery are repeated, charge/discharge reproducibility and energy density may decrease.

SUMMARY

Provided are secondary batteries in which an anode, a separator, and a cathode, each having a guide are sequentially stacked and methods of manufacturing the secondary batteries.

Also, provided are secondary batteries with improved alignment of a plurality of anodes, separators, and cathodes and methods of manufacturing the secondary batteries.

Provided are secondary batteries with improved convenience in a manufacturing process in which a plurality of anodes, separators, and cathodes are stacked and methods of manufacturing the secondary batteries.

Provided are secondary batteries with increased charge/discharge reproducibility and energy density and methods of manufacturing the secondary batteries.

Additional aspects will be set forth in part in the description which follows and, in part, will be apparent from the description, or may be learned by practice of an embodiment of the disclosure.

According to an aspect of an embodiment, a secondary battery includes: an anode including an anode active material on an anode active material support; a cathode including a cathode active material on a cathode active material support; a separator between the anode and the cathode; an anode guide extending in a first direction from a first region along an edge of the anode active material support; and a cathode guide extending in a second direction from a second region along an edge of the cathode active material support.

The first direction and the second direction may be different; and the first region and the second region may be at non-overlapping positions.

An absolute value of a difference between a first radial distance between a first end of the cathode active material and a first end of the anode active material, the first end of the anode active material being an end of the anode active material closest to the first end of the cathode active material, and a second radial distance between a second end of the cathode active material and a second end of the anode active material, the second end of the anode active material being an end of the anode active material closest to the second end of the cathode active material, may be about 10 micrometers (µm) to about 100 µm.

A width of the anode guide may decrease in a direction from an end of the anode guide toward the anode active material support.

The secondary battery may further include an anode connection protrusion extending in a third direction from a third region along the edge of the anode active material support, wherein the first direction and the third direction are opposite directions.

The secondary battery may further include an anode connection protrusion extending in a third direction from a third region along the edge of the anode active material support, wherein the first direction and the third direction are not a same direction or opposing directions.

The secondary battery may include a plurality of the anode guides, and each anode guide of the plurality of anode guides may be arranged so as to be separated from each other.

The anode active material support, the anode guide, and the anode connection protrusion may each have a plate shape and includes a conductive material.

The anode guide may have a length that is about 2% to about 20% of a diameter of the anode active material support, and the anode guide may have a width that is about 2% to about 20% of the diameter of the anode active material support.

A width of the cathode guide may decrease in a direction from an end of the cathode guide toward the cathode active material support.

The secondary battery may further include a cathode connection protrusion extending in a fourth direction from a fourth region along the edge of the cathode active material support, wherein the second direction and the fourth direction are opposite directions.

The secondary battery may further include a cathode connection protrusion extending in a fourth direction from a fourth region along the edge of the cathode active material support, wherein the second direction and the fourth direction are not a same direction or opposite directions.

The secondary battery may include a plurality of the cathode guides, and each cathode guide of the plurality of cathode guides may be arranged so as to be separated from each other.

The cathode active material support, the cathode guide, and the cathode connection protrusion may each have a plate shape and include a conductive material.

The cathode guide may have a length that is about 2% to about 20% of a diameter of the cathode active material support, and the cathode guide may have a width that is about 2% to about 20% of the diameter of the cathode active material support.

The secondary battery may further include a separator including a separator guide extending in a fifth direction from a region along an edge of the separator.

The secondary battery may further include an anode current collector electrically connected to the anode, and a cathode current collector electrically connected to the cathode.

The anode active material support may have a circular shape, the cathode active material support may have a circular shape, the first region may be along a circumference of the anode active material support; and the second region may be along a circumference of the cathode active material support.

According to an aspect of an embodiment, a method of manufacturing a secondary battery includes: a first operation of providing a stacking jig comprising an anode guide seating unit, a cathode guide seating unit, and a separator guide seating unit; a second operation of arranging a cathode so that a cathode guide of the cathode is seated in the cathode guide seating unit; a third operation of arranging a separator so that a separator guide of the separator is seated in the separator guide seating unit; a fourth operation of arranging an anode so that an anode guide of the anode is seated in the anode guide seating unit; repeating the second and fourth operations; connecting a plurality of anode connection protrusions of a plurality of anodes to each other; connecting a plurality of cathode connection protrusions of a plurality of cathodes to each other; bending the anode guide, the cathode guide, the separator guide, the plurality of anode connection protrusions, and the plurality of cathode connection protrusions to electrically connect the plurality of anode connection protrusions and electrically connect the plurality of cathode connection protrusions; electrically connecting the plurality of anodes to an anode current collector, and electrically connecting the plurality of cathodes to a cathode current collector to manufacture the secondary battery.

The anode guide may extend in a first direction from a first region along an edge of the anode active material support, and the cathode guide may extend in a second direction from a second region along an edge of the cathode active material support, the first direction and the second direction may be different, and the first region and the second region may be at non-overlapping positions.

An absolute value of a difference between a first radial distance between a first end of the cathode active material and a first end of the anode active material, the first end of the anode active material being an end of the anode active material closest to the first end of the cathode active material, and a second radial distance between a second end of the cathode active material and a second end of the anode active material, the second end of the anode active material being an end of the anode active material closest to the second end of the cathode active material, may be about 10 µm to about 100 µm.

According to an aspect of an embodiment, a secondary battery including: a plurality of anodes stacked in a stacking direction, the plurality of anodes including anode connection protrusions electrically connecting the plurality of anodes, the anode connection protrusions being bent in the first direction or opposite the first direction, and anode guides bent in the first direction or opposite the first direction; a plurality of cathodes stacked in the stacking direction, the plurality of cathodes including cathode connection protrusions electrically connecting the plurality of cathodes, the cathode connection protrusions being bent in the first direction or opposite the first direction, and cathode guides bent in the first direction or opposite the first direction; a plurality of separators between the plurality of anodes and the plurality of cathodes; a cathode current collector electrically connected to the cathode connection protrusions; an anode current collector electrically connected to anode connection protrusions; an anode terminal electrically connected to the anode current collector; and a cathode terminal electrically connected to the cathode current collector.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
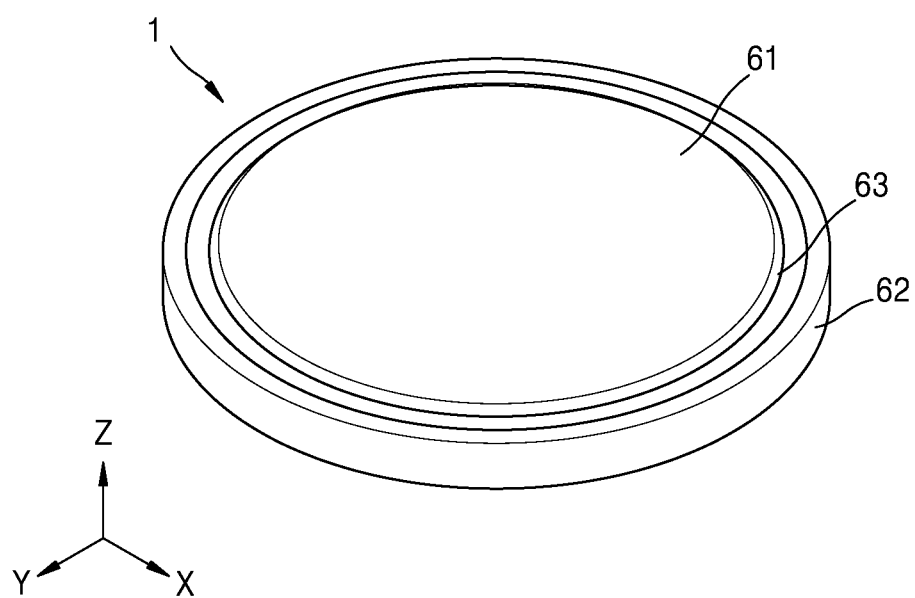
FIG. 1 is a perspective view of an embodiment of a secondary battery.

Reference will now be made in detail to an embodiment, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, secondary batteries according to an embodiment will be described in detail with reference to the accompanying drawings. In the drawings, thicknesses of layers and regions may be exaggerated or reduced for clarity and convenience of explanation. A secondary battery is capable of various modifications and may be embodied in many different forms. It will be understood that when an element or layer is referred to as being "on" or "above" another element or layer, the element or layer may be directly on another element or layer or intervening elements or layers. In the present specification, "one side" and "the other side" refer to surfaces positioned opposite to each other, and "one direction" and "the other direction" refer to directions opposite to each other.

It will be understood that, although the terms "first," "second," "third," etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
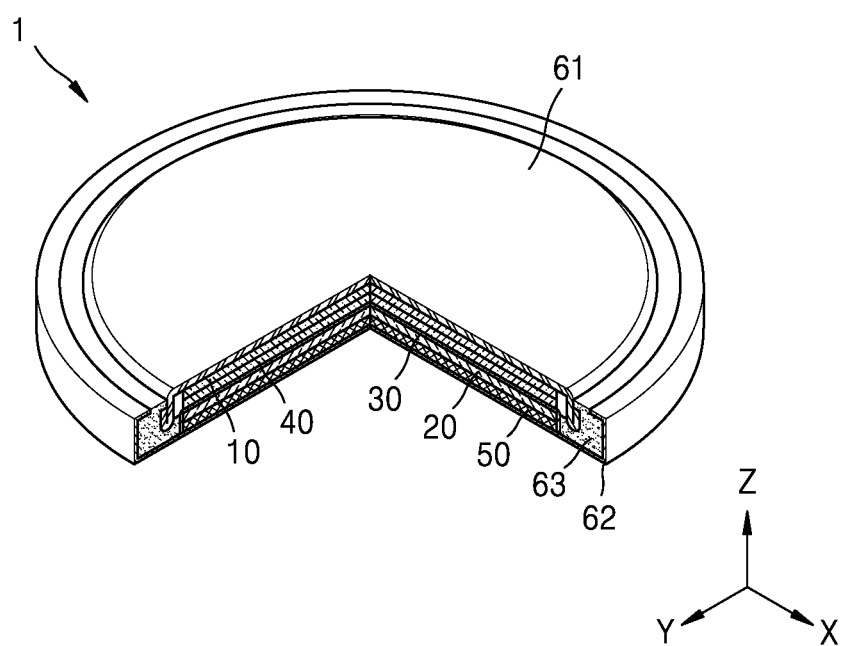
FIG. 2 is a partially cut-away view of the secondary battery of FIG. 1.

FIG. 1 is a perspective view of a secondary battery 1 according to an embodiment. FIG. 2 is a partially cut-away view of the secondary battery 1 of FIG. 1 according to an embodiment.

Referring to FIGS. 1 and 2, the secondary battery 1 according to an embodiment may be a coin-type secondary battery. However, the secondary battery 1 described in the present specification is not limited to a coin-type secondary battery.

The secondary battery 1 according to an embodiment may include an anode 10, a cathode 20, a separator 30, an anode current collector 40, a cathode current collector 50, an anode can 61 serving as an anode terminal, a cathode can 62 serving as an cathode terminal, and a gasket 63.

The anode 10 may include an anode active material support 100 (refer to FIG. 3A) and an anode active material 150 (refer to FIG. 3A) supported by, e.g., on, the anode active material support 100. The anode 10 according to an embodiment may be provided in a plate shape extending along one plane. The anode 10 will be described in more detail with reference to FIGS. 3A to 4B.

The cathode 20 may include a cathode active material support 200 (refer to FIG. 5A) and a cathode active material 250 (refer to FIG. 5A) supported by, e.g., on, the cathode active material support 200. The cathode 20 according to an embodiment may be provided in a plate shape extending along one plane, and may be arranged to face the anode 10. The cathode 20 will be described in more detail with reference to FIGS. 5A to 6B.

The separator 30 may be arranged between the anode 10 and the cathode 20 to separate the anode 10 and the cathode 20. The separator 30 according to an embodiment may be provided in a plate shape extending along one plane, and may be arranged between the anode 10 and the cathode 20. The separator 30 will be described in more detail with reference to FIG. 7.

The anode current collector 40 may be electrically connected to the anode 10. The anode current collector 40 according to an embodiment may be provided in a plate shape including a metal material, for example, copper, aluminum, or a conductive material, and may be arranged between the anode 10 and the anode can 61 to be described herein.

The cathode current collector 50 may be electrically connected to the cathode 20. The cathode current collector 50 according to an embodiment may be provided in a plate shape including a metal material, for example copper, aluminum, or a conductive material, and may be arranged between the cathode 20 and the cathode can 62 to be described herein.

The anode can 61 may be an accommodation unit that may accommodate the anode 10, the cathode 20, the separator 30, the anode current collector 40, and the cathode current collector 50. Also, the anode can 61 may be arranged to contact the anode current collector 40 to function as an anode terminal. The anode can 61 according to an embodiment may include at least one of nickel, aluminum, copper, stainless steel, titanium, or an alloy thereof.

The cathode can 62 may be an accommodation unit that separates the anode 10, the cathode 20, the separator 30, the cathode current collector 40, and the anode current collector 50 from the outside by being combined with the anode can 61. Also, the cathode can 62 may be arranged to contact the cathode current collector 50 to function as a cathode terminal. The cathode can 62 according to an embodiment may include at least one of nickel, aluminum, stainless steel, titanium, or an alloy thereof.

The gasket 63 may be an insulating member capable of insulating the anode can 61 and the cathode can 62 from each other by being arranged between the anode can 61 and the cathode can 62. Also, the gasket 63 may be a sealing member capable of separating an inside of the anode can 61 and the cathode can 62 from the outside by being arranged between the anode can 61 and the cathode can 62. The gasket 63 according to an embodiment may be provided in a form of a hollow ring. Also, the gasket 63 may include a material having insulation and sealing properties, for example polypropylene. However, the present disclosure is not limited thereto, that is, the gasket 63 may have any suitable shape and any suitable material having suitable insulation and sealing properties.

As shown in FIG. 2, the secondary battery 1 may be manufactured such that, after sequentially stacking the cathode 20, the separator 30, the anode 10, and the anode can 61 with the cathode can 62 positioned below, the anode can 61 and the cathode can 62 are pressed by interposing the gasket 63 therebetween. In a process of sequentially repeatedly stacking the cathode 20, the separator 30, and the anode 10 according to an embodiment, the alignment of the cathode 20, the separator 30, and the anode 10 may be misaligned. When the alignment of the cathode 20, the separator 30, and the anode 10 is misaligned, lithium ions released from the anode 10 may not be easily transferred to the cathode 20. Hereinafter, an alignment guide to aid alignment in a process of sequentially stacking the cathode 20, the separator 30, and the anode 10, and a method of manufacturing a secondary battery by using the alignment guide will be described in more detail.

Figure 3A:
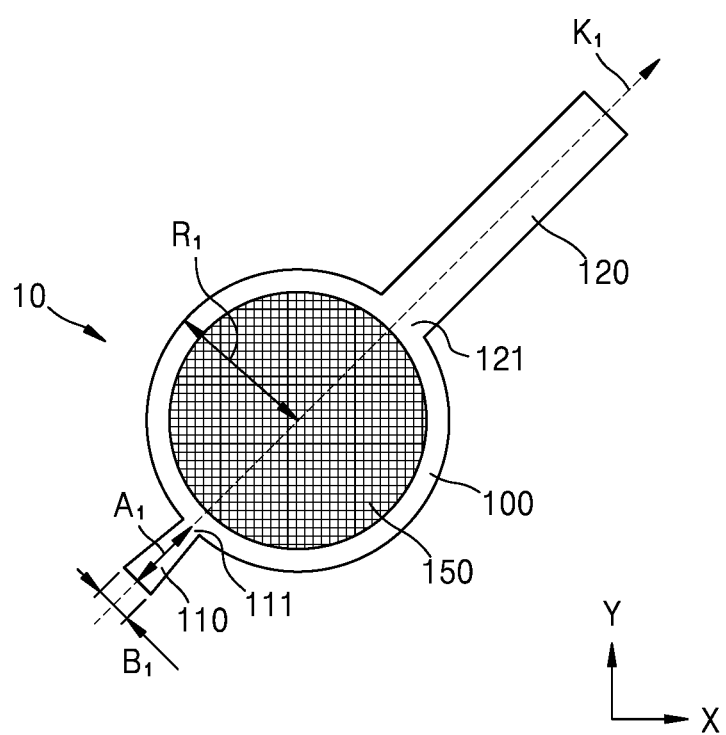
FIG. 3A is a plan view of an embodiment of an anode, an anode connection protrusion, and an anode guide.
Figure 3B:
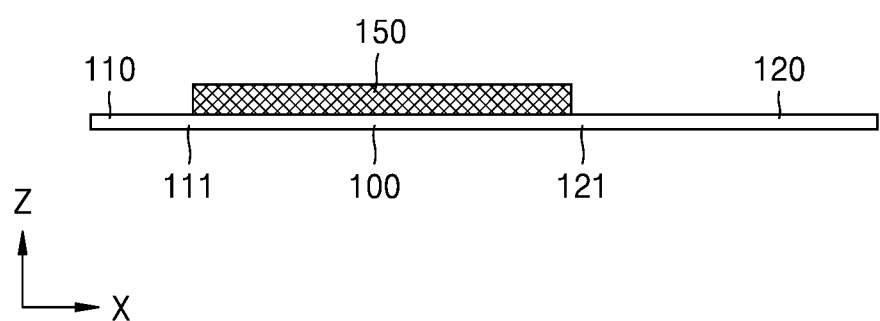
FIG. 3B is a side view of the anode, the anode connection protrusion, and the anode guide shown in FIG. 3A.

FIG. 3A is a plan view of the anode 10, an anode connection protrusion 120, and an anode guide 110 according to an embodiment. FIG. 3B is a side view of the anode 10, the anode connection protrusion, and the anode guide 110 shown in FIG. 3A.

Referring to FIGS. 3A and 3B, the anode 10 according to an embodiment may include an anode active material support 100 and an anode active material 150 supported by, e.g., on, the anode active material support 100. The anode active material 150 may be coated on one or both surfaces of the anode active material support 100. As an example, the anode active material 150 may include at least one of lithium metal, a metal that is alloyable with lithium, a transition metal oxide, a non-transition metal oxide, carbon, or a combination thereof. Examples of the alloy include a Si or Sn alloy. Examples of the transition metal oxide include a lithium titanium oxide, a vanadium oxide, and a lithium vanadium oxide. Examples of the non-transition metal oxide may include $SnO_2$ and $SiO_x$ (where, $0<x<2$). The carbon may be crystalline carbon, amorphous carbon, or a mixture thereof. Examples of the crystalline carbon may include natural graphite and artificial graphite, soft carbon (carbon calcined at a low-temperature), hard carbon, meso-phase pitch carbide, and calcined cokes.

Also, the anode active material support 100 may be provided in a thin metal plate shape having a predetermined thickness, and may have various shapes according to the shapes of the anode can 61 and the cathode can 62. As an example, the anode active material support 100 may have a circular shape as shown in FIG. 3A, but the present disclosure is not limited thereto and may have a polygonal shape. Also, the anode material support 100 may include copper, aluminum, titanium, or other suitable conductive material.

The anode active material 150 according to an embodiment may be coated on one or both surfaces of the anode active material support 100 by using a coater. As an example, when the anode active material 150 is coated on a surface of the anode active material support 100, the corresponding anode active material support 100 may be arranged proximate to the anode can 61. Also, when the anode active material 150 is coated on both surfaces of the anode active material support 100, the corresponding anode active material support 100 may be arranged so that both surfaces of the anode active material support 100 face the cathode active material 250.

The anode guide 110 may extend from, e.g., be connected to, the anode active material support 100 to guide a stacking path of the anode 10. The anode guide 110 according to an embodiment may have a shape extending in one direction (as used herein with respect to the anode guide 110, a "first direction"). The anode guide 110 may have a suitable shape, e.g., corresponding to an anode guide seating unit 710 (refer to FIG. 8A) provided in a stacking jig 70 (refer to FIG. 8A) to be described herein. As an example, the anode guide 110 may have a shape of which a width reduces, e.g., decreases, as the anode guide 110 approaches the anode active material support 100, e.g., in a direction from an end of the anode guide 110 toward the anode active material support 100. Accordingly, the stacking position of the anode 10 may be fixed by preventing a phenomenon of moving the anode guide 110, e.g., in a same direction as the first direction. However, the present disclosure is not limited thereto, and the anode guide 110 may have an any suitable shape to minimize or prevent moving of the anode guide 110 accommodated in the anode guide seating unit 710.

The anode guide 110 according to an embodiment may extend from, e.g., be connected to, a first region 111 along a circumference of the anode active material support 100. As an example, as shown in FIG. 3A, the anode guide 110 extending in one direction, e.g., the first direction, may extend from, e.g., be connected to, the anode active material support 100 to protrude along, e.g., from, the circumference of the anode active material support 100. As an example, the anode guide 110 may have a length $A_1$ of about 2% to about 20% with respect to, e.g., of, the greatest, e.g., longest, length, e.g., dimension, of the anode active material support 100, for example, when the anode active material support 100 is provided in, e.g., has, a circular shape, a diameter equal to 2 times a radius ($R_1$) of the anode active material support 100. Also, the anode guide 110 may have a width $B_1$ of about 2% to about 20% with respect to, e.g., of, the greatest, e.g., longest, length, e.g., dimension, of the anode active material support 100, for example, when the anode active material support 100 is provided in, e.g., has, a circular shape, the diameter equal to 2 times the radius ($R_1$) of the anode active material support 100.

Also, the anode guide 110 may be provided in a thin plate shape including the same material, for example, aluminum, copper, titanium, or other suitable conductive material as the anode active material support 100, and may be integrally formed with the anode active material support 100. Accordingly, the anode 10 connected to the anode guide 110 may be stacked at a predetermined position along a stacking path guided by the anode guide 110.

The anode connection protrusion 120 is an electrical connection element for electrically connecting the plurality of anodes 10 stacked in a stacking direction (orthogonal to a major surface, a Z-direction). According to an embodiment, the anode connection protrusion 120 may have a shape extending in one direction (as used herein with respect to the anode connection protrusion 120, a "third direction"), and may extend from, e.g., be connected to, a third region 121 along the circumference of the anode active material support 100. The third region 121 to which the anode connection protrusion 120 is connected, e.g., from which the anode connection protrusion 120 extends, may be arranged at a position separate from the first region 111 to which the anode guide 110 is connected, e.g., from which the anode guide 110 extends, so as not to interfere with each other.

As an example, the anode connection protrusion 120 may be arranged to protrude to the outside of, e.g., from, the anode active material support 100 as illustrated in FIG. 3A. The anode connection protrusion 120 may be provided in a thin plate shape including the same material, for example copper or titanium, as the anode active material support 100, and may be integrally formed with the anode active material support 100 and the anode guide 110. Accordingly, the anode 10 connected to the anode connection protrusion 120 may be electrically connected to another anode 10 stacked in the stacking direction (the Z-direction).

As described herein, the anode guide 110 and the anode connection protrusion 120 may extend from, e.g., be connected to, the anode active material support 100 so as not to interfere with each other. Accordingly, the anode guide 110 may be arranged at various positions that do not interfere with the anode connection protrusion 120, and may be configured in plurality, e.g., a plurality of anode guides 110 may be included.

Figure 4A:
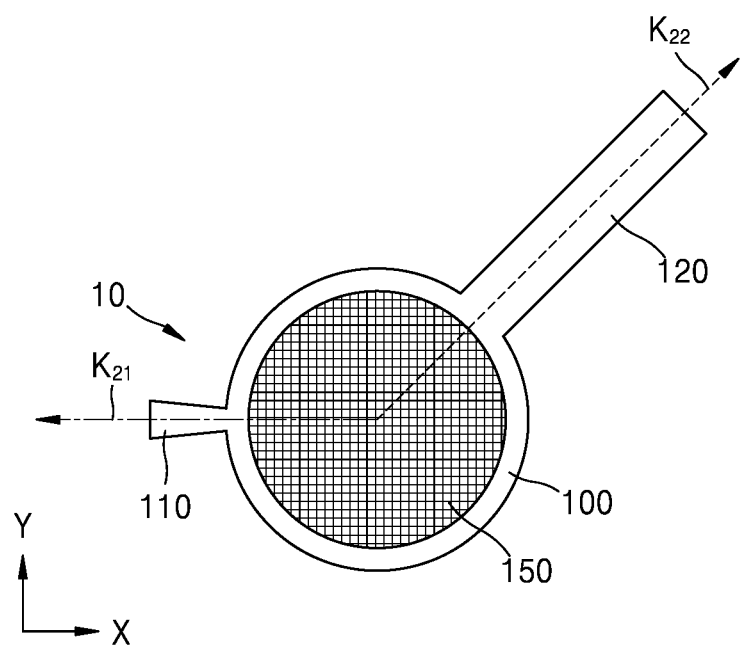
FIG. 4A is a plan view of an embodiment of an anode, an anode connection protrusion, and an anode guide.
Figure 4B:
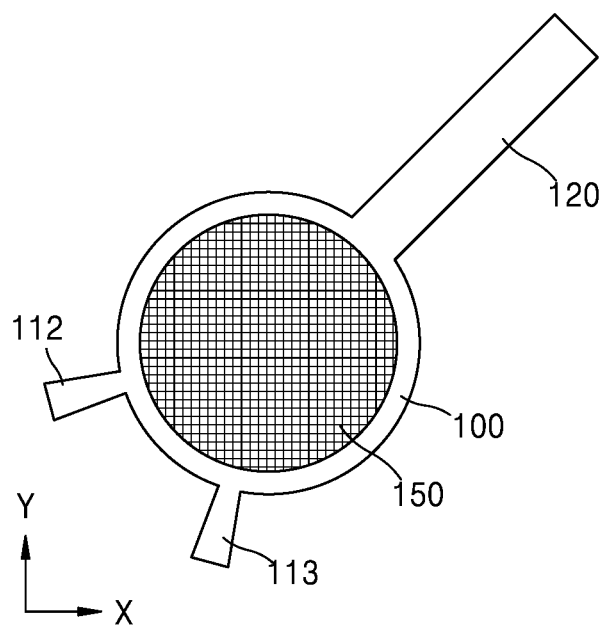
FIG. 4B is a plan view of an embodiment of an anode, an anode connection protrusion, and an anode guide.

FIG. 4A is a plan view of an anode 10, an anode connection protrusion 120, and an anode guide 110 according to an embodiment. FIG. 4B is a plan view of an anode 10, an anode connection protrusion 120, and an anode guide according to an embodiment.

Referring to FIG. 3A, the anode guide 110 according to an embodiment may be arranged to extend in an opposite direction from the anode connection protrusion 120. As an example, the anode guide 110 may be arranged to extend in one direction, e.g., the first direction, $K_i$, and the anode connection protrusion 120 may be arranged to extend in a direction opposite to $K_i$. When the anode guide 110 and the anode connection protrusion 120 are arranged to extend in opposite directions, there may be some manufacturing conveniences.

Also, referring to FIG. 4A, the anode guide 110 according to an embodiment may be arranged to extend in a different direction from the anode connection protrusion 120, e.g., not a same direction or an opposite direction. As an example, the anode guide 110 may be arranged to extend in one direction, e.g., the first direction, $K_{21}$, and the anode connection protrusion 120 may be arranged to extend in a direction $K_{22}$ different from the one direction, e.g., the first direction, $K_{21}$. When the anode guide 110 and the anode connection protrusion 120 are arranged to extend in different directions, e.g., not a same direction or opposite directions, the phenomenon of moving the anode 10, e.g., in a same direction as a direction in which the anode guide 110 or the anode connection protrusion 120 extend, may be prevented.

Also, referring to FIG. 4B, a plurality of anode guides 110 according to an embodiment may be provided. As an example, the plurality of anode guides 110 may include a first anode guide 112 and a second anode guide 113. The first anode guide 112 and the second anode guide 113 may extend in different directions from each other, e.g., not a same direction or opposite directions. Also, the first anode guide 112 and the second anode guide 113 may be disposed along a circumference of the anode active material support 100 so as to be separated from each other by a predetermined distance. In an embodiment described herein, two anode guides have been described, but the present disclosure is not limited thereto, that is, any suitable number of anode guides 110 that do not interfere with the anode connection protrusion 120 may be arranged along the circumference of the anode active material support 100.

Figure 5A:
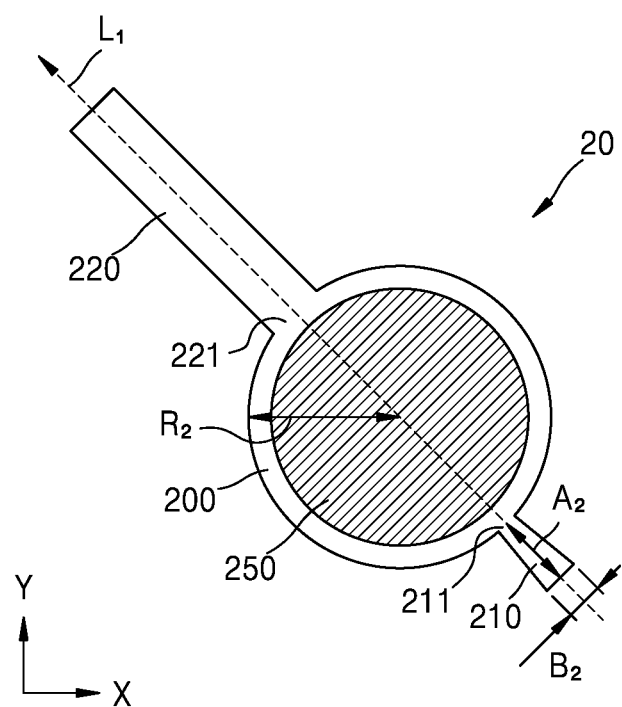
FIG. 5A is a plan view of an embodiment of a cathode, a cathode connection protrusion, and a cathode guide.
Figure 5B:
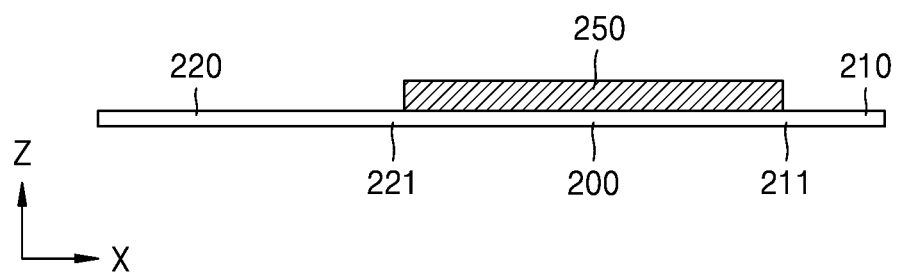
FIG. 5B is a side view of the cathode, the cathode connection protrusion, and the cathode guide shown in FIG. 5A.

FIG. 5A is a plan view of a cathode 20, a cathode connection protrusion 220, and a cathode guide 210 according to an embodiment. FIG. 5B is a side view of the cathode 20, the cathode connection protrusion 220, and the cathode guide 210 shown in FIG. 5A.

Referring to FIGS. 5A and 5B, the cathode 20 according to an embodiment may include a cathode active material support 200 and a cathode active material 250 supported by, e.g., on, the cathode active material support 200. The cathode active material 250 may be coated on one or both sides of the cathode active material support 200. As an example, the cathode active material 250 may include at least one of a nickel-cobalt-manganese ("NCM") active material, a nickel-cobalt-aluminum ("NCA") active material, a lithium-cobalt oxide ("LCO") active material, a lithium-nickel oxide ("LNO") active material, or a lithium-iron phosphate ("LFP") active material. Examples include $Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1$, $0 \leq b \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aN_{i_b}E_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. A combination comprising at least one of the foregoing may be used. In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

Also, the cathode active material support 200 may be provided in a thin metal plate having a predetermined thickness, and may have various shapes according to the shapes of the anode can 61 and the cathode can 62. As an example, the cathode active material support 200 may have a circular shape as shown in FIG. 5A, but the present disclosure is not limited thereto and may have a polygonal shape. Also, the cathode material support 200 may include copper, aluminum, or a conductive material.

The cathode active material 250 according to an embodiment may be coated on one or both surfaces of the cathode active material support 200 by using a coater. As an example, when the cathode active material 250 is coated on a surface of the cathode active material support 100, the corresponding cathode active material support 200 may be arranged proximate the cathode can 62. Also, when the cathode active material 250 is coated on both surfaces of the cathode active material support 200, the corresponding cathode active material support 200 may be arranged so that both surfaces of the cathode active material support 100 face the anode active material 150.

The cathode guide 210 may extend from, e.g., be connected to, the cathode active material support 100 to guide a stacking path of the cathode 20. The cathode guide 210 according to an embodiment may have a shape extending in one direction (as used herein with respect to the cathode guide 210, a "second direction"). The cathode guide 210 may have a suitable shape, e.g., corresponding to a cathode guide seating unit 710 (refer to FIG. 8A) provided in a stacking jig 70 (refer to FIG. 8A) to be described herein. As an example, the cathode guide 210 may have a shape of which a width reduces, e.g., decreases, as the cathode guide 210 approaches the cathode active material support 200, e.g., in a direction from an end of the cathode guide 210 toward the cathode active material support 200. Accordingly, the stacking position of the cathode 20 may be fixed by preventing a phenomenon of moving the cathode guide 210, e.g., in a same direction as the first direction. However, the present disclosure is not limited thereto, and the cathode guide 210 may have an any suitable shape to minimize or prevent moving of the cathode guide 210 accommodated in the cathode guide seating unit 720.

The cathode guide 210 according to an embodiment may extend from, e.g., be connected to, a second region 211 along a circumference of the cathode active material support 200. As an example, as shown in FIG. 5A, the cathode guide 210 extending in one direction, e.g., the second direction, may extend from, e.g., be connected to, the cathode active material support 200 to protrude along, e.g., from, the circumference of the cathode active material support 200. As an example, when the longest length of the cathode active material support 200, for example, the cathode active material support 200 has a circular shape, the cathode guide 210 may have a length $A_2$ of about 2% to about 20% with respect to, e.g., of, the greatest, e.g., longest, length, e.g., dimension, of the cathode active material support 200. Also, when the longest length of the cathode active material support 200, for example, the cathode active material support 200 has a circular shape, the cathode guide 210 may have a width $B_2$ of about 2% to about 20% with respect to, e.g., of, the greatest, e.g., longest, length, e.g., dimension, of the cathode active material support 200.

Also, the cathode guide 210 may be provided in a thin plate shape and include the same material, for example, copper, aluminum, or a conductive material as the cathode active material support 200, and may be integrally formed with the cathode active material support 200. Accordingly, the cathode 20 connected to the cathode guide 210 may be stacked at a predetermined position along a stacking path guided by the cathode guide 210.

The cathode connection protrusion 220 is an electrical connection element for electrically connecting the plurality of cathodes 20 stacked in the stacking direction (the Z-direction). According to an embodiment, the cathode connection protrusion 220 may have a shape extending in one direction (as used herein with respect to the cathode connection protrusion 220, a "fourth direction"), and may extend from, e.g., be connected to, a fourth region 221 along the circumference of the cathode active material support 200. The fourth region 221 to which the cathode connection protrusion 220 is connected, e.g., from which the cathode connection protrusion 220 extends, may be arranged at a position separate from the second region 211 to which the cathode guide 210 is connected, e.g., from which the cathode guide 210 extends, so as not to interfere with each other.

As an example, the cathode connection protrusion 220 may be arranged to protrude to the outside of, e.g., from, the cathode active material support 200 as illustrated in FIG. 5A. The cathode connection protrusion 220 may be provided in a thin plate shape including the same material, for example, copper, aluminum, or a conductive material as the cathode active material support 200, and may be integrally formed with the cathode active material support 200 and the cathode guide 210. Accordingly, the cathode 20 connected to the cathode connection protrusion 220 may be electrically connected to another cathode 20 stacked in the stacking direction (the Z-direction).

As described herein, the cathode guide 210 and the cathode connection protrusion 220 may extend from, e.g., be connected to, the cathode active material support 200 so as not to interfere with each other. Accordingly, the cathode guide 210 may be arranged at various positions that do not interfere with the cathode connection protrusion 220, and may be configured in plurality, e.g., a plurality of cathode guides 210 may be included.

Figure 6A:
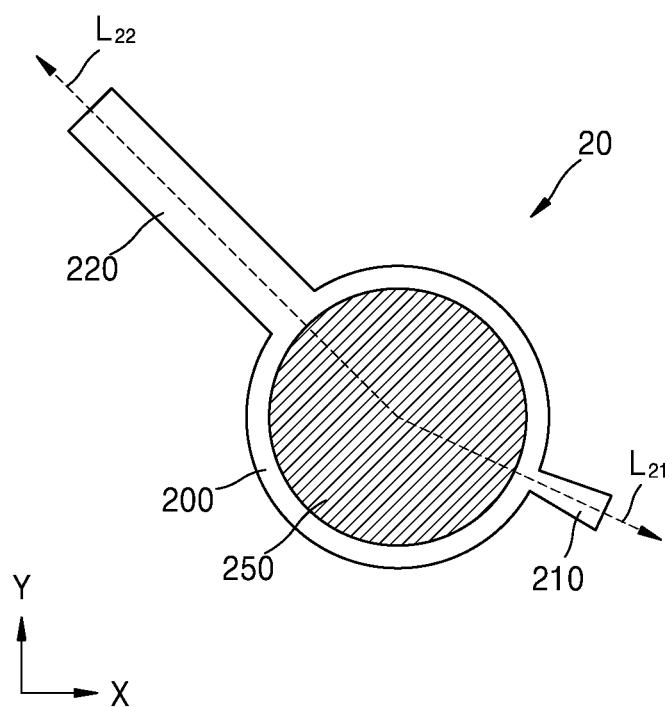
FIG. 6A is a plan view of an embodiment of a cathode, a cathode connection protrusion, and a cathode guide.
Figure 6B:
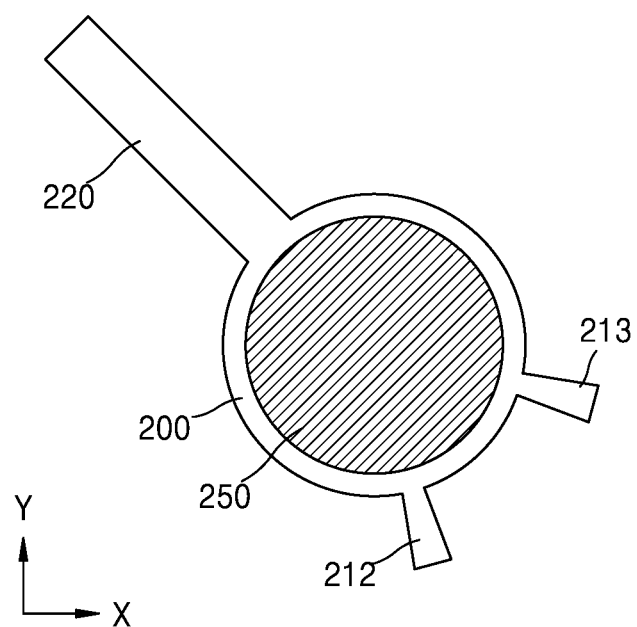
FIG. 6B is a plan view of an embodiment of a cathode, a cathode connection protrusion, and a cathode guide.

FIG. 6A is a plan view of a cathode 20, a cathode connection protrusion 220, and a cathode guide 210 according to an embodiment. FIG. 6B is a plan view of a cathode 20, a cathode connection protrusion 220, and cathode guides 212 and 213 according to an embodiment.

Referring to FIG. 5A, the cathode guide 210 according to an embodiment may be arranged to extend in an opposite direction from the cathode connection protrusion 220. As an example, the cathode guide 210 may be arranged to extend in one direction, e.g., the second direction, $L_1$, and the cathode connection protrusion 220 may be arranged to extend in a direction opposite to $L_1$. When the cathode guide 210 and the cathode connection protrusion 220 are arranged to extend in opposite directions, there may be some manufacturing conveniences.

Also, referring to FIG. 6A, the cathode guide 210 according to an embodiment may be arranged to extend in a direction different from the cathode connection protrusion 220, e.g., not a same direction or an opposite direction. As an example, the cathode guide 210 may be arranged to extend in one direction, e.g., the second direction, $L_{21}$, and the cathode connection protrusion 220 may be arranged to extend in a $L_{22}$ different from the one direction, e.g., the second direction, $L_{21}$. When the cathode guide 210 and the cathode connection protrusion 220 are arranged to extend in different directions, e.g., not a same direction or opposite directions, the phenomenon of moving the cathode 20, e.g., in a same direction as a direction in which the cathode guide 210 or the cathode connection protrusion 220 extend, may be prevented.

Also, referring to FIG. 6B, a plurality of cathode guides 210 according to an embodiment may be provided. As an example, the plurality of cathode guides 210 may include a first cathode guide 212 and a second cathode guide 213. The first cathode guide 212 and the second cathode guide 213 may extend in different directions from each other e.g., not a same direction or opposite directions. In addition, the first cathode guide 212 and the second cathode guide 213 may be arranged along a circumference of the cathode active material support 200 so as to be separated from each other by a predetermined distance. In an embodiment described herein, two cathode guides have been described, but the present disclosure is not limited thereto, that is, any suitable number of cathode guides 210 that do not interfere with the cathode connection protrusions 220 may be arranged along the circumference of the cathode active material support 200.

Figure 7:
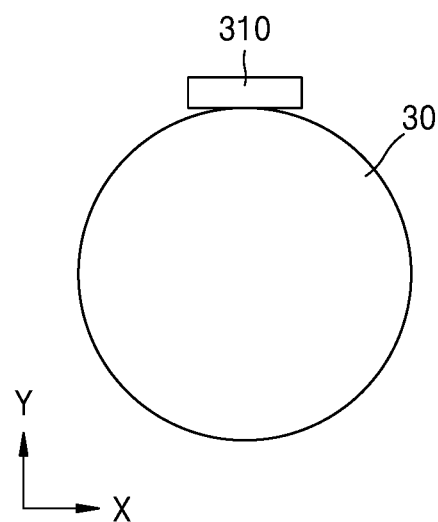
FIG. 7 is a plan view of an embodiment of a separator and a separator guide.

FIG. 7 is a plan view of a separator 30 and a separator guide 310 according to an embodiment.

Referring to FIG. 7, the separator 30 according to an embodiment may be provided in a flat plate shape extending along one plane. As an example, the separator 30 may include a material that may separate the anode 10 and the cathode 20, for example, at least one of a polyethylene film or a polypropylene film. For example, the separator 30 may be provided in a thin plate shape having a predetermined thickness, and may have various shapes according to the shapes of the anode 10 and the cathode 20. As an example, the separator 30 may have a circular shape as shown in FIG. 7, but the present disclosure is not limited thereto and may have a polygonal shape.

The separator guide 310 may extend from, e.g., be connected to, the separator 30 to guide a stacking path of the separator 30. The separator guide 310 according to an embodiment may have a shape extending in one direction (as used herein with respect to the separator guide 310, a "fifth direction". The shape of the separator guide 310 may have a suitable shape, e.g., corresponding to a separator guide seating unit 730 (refer to FIG. 8A) provided in a stacking jig 70 (refer to FIG. 8A) to be described herein.

The separator guide 310 according to an embodiment may extend from, e.g., be connected to, a region along a circumference of the separator 30. As an example, as shown in FIG. 7, the separator guide 310 extending in one direction, e.g., the fifth direction, may extend from, e.g., be connected to, protrude along, e.g., from, the circumference of the separator 30. The separator guide 310 may be provided in a thin plate shape including the same material as the separator 30, and may be integrally formed with the separator 30. Accordingly, the separator 30 connected to the separator guide 310 may be stacked at a predetermined position along a stacking path guided by the separator guide 310.

FIGS. 8A to 8H are diagrams each illustrating a method of manufacturing a secondary battery according to an embodiment.

Figure 8A:
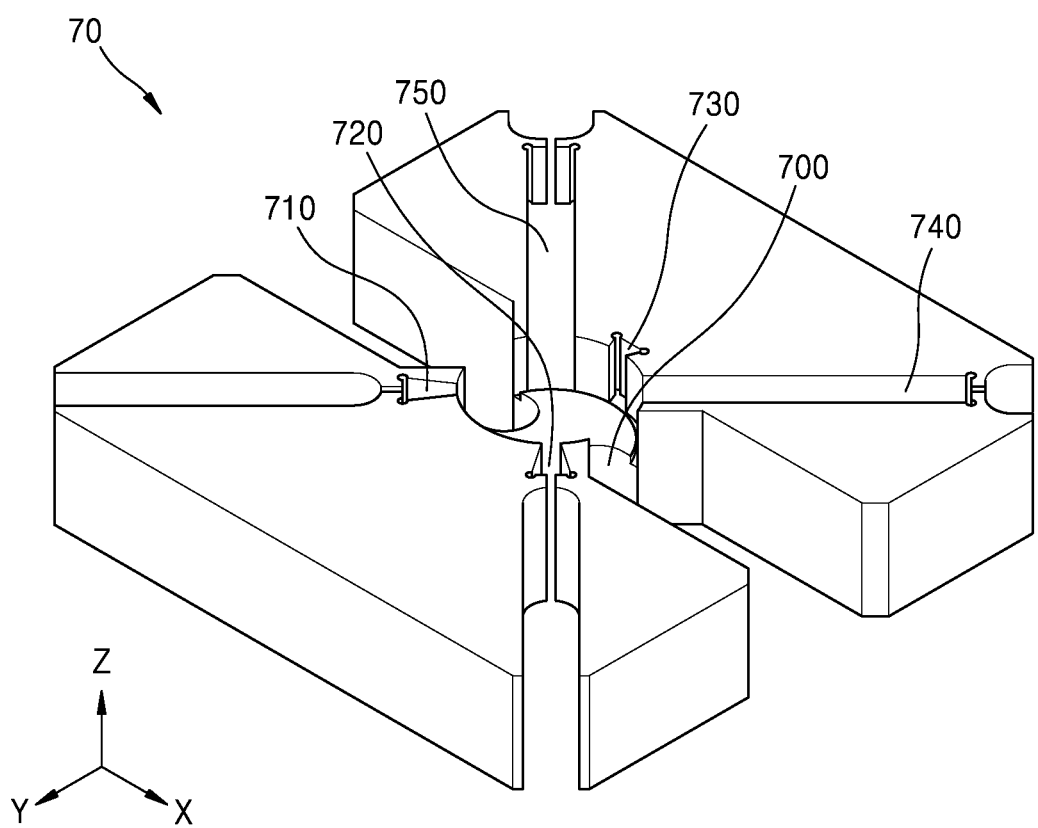
FIGS. 8A to 8H are diagrams each illustrating an embodiment of a method of manufacturing a secondary battery.

Referring to FIG. 8A, a stacking jig 70 according to an embodiment may be provided. The stacking jig 70 according to an embodiment may include a support seating unit 700, an anode guide seating unit 710, a cathode guide seating unit 720, a separator guide seating unit 730, an anode connection protrusion seating unit 740, and a cathode connection protrusion seating unit 750.

The support seating unit 700 is an accommodation unit in which the anode active material support 100, the cathode active material support 200, and the separator 30 may be seated. The support seating unit 700 according to an embodiment may be formed in a stacking direction of the anode 10, the cathode 20, and the separator 30, that is, in the stacking direction (the Z-direction). The support seating unit 700 may have a shape corresponding to the shape of the anode active material support 100, the cathode active material support 200, and the separator 30 to be accommodated. For example, the support seating unit 700 may be provided in a shape corresponding to a circular shape of the anode active material support 100, the cathode active material support 200, and the separator 30, as shown in FIG. 8A. Also, a size of the support seating unit 700 may be determined according to the greatest size of the anode active material support 100, the cathode active material support 200, and the separator 30, which are to be accommodated in the support seating unit 700. As an example, among diameters of the anode active material support 100, the cathode active material support 200, and the separator 30, the diameter of the separator 30 may be the greatest, and the diameter of the support seating unit 700 may be determined to correspond to the diameter of separator 30.

The anode guide seating unit 710 is an accommodation unit in which the anode guide 110 may be seated. The anode guide seating unit 710 according to an embodiment may be formed to extend in the stacking direction (the Z-direction). The anode guide seating unit 710 may have a shape corresponding to the shape of the anode guide 110 to be accommodated. For example, the anode guide seating unit 710 may be provided in a shape corresponding to a fan shape of the anode guide 110 as illustrated in FIG. 8A. Also, the size of the anode guide seating unit 710 may be determined according to the size of the anode guide 110 to be accommodated.

The cathode guide seating unit 720 is an accommodation unit in which the cathode guide 210 may be seated. The cathode guide seating unit 720 according to an embodiment may be formed to extend in the stacking direction (the Z-direction). The cathode guide seating unit 720 may have a shape corresponding to the shape of the cathode guide 210 to be accommodated. For example, the cathode guide seating unit 720 may be provided in a shape corresponding to a fan shape of the cathode guide 210 as illustrated in FIG. 8A. Also, the size of the cathode guide seating unit 720 may be determined according to the size of the cathode guide 210 to be accommodated.

The separator guide seating unit 730 is an accommodation unit in which the separator guide 310 may be seated. The separator guide seating unit 730 according to an embodiment may be formed to extend in the stacking direction (the Z-direction). The separator guide seating unit 730 may have a shape corresponding to the shape of the separator guide 310 to be accommodated. Also, the size of the separator guide seating unit 730 may be determined according to the size of the separator guide 310 to be accommodated.

The anode connection protrusion seating unit 740 and the cathode connection protrusion seating unit 750 respectively are accommodation units in which the anode connection protrusion 120 and the cathode connection protrusion 220 may be seated. The anode connection protrusion seating unit 740 and the cathode connection protrusion seating unit 750 according to an embodiment may be formed to extend in the stacking direction (the Z-direction). The anode electrode connection protrusion seating unit 740 and the cathode connection protrusion seating unit 750 may have a shape corresponding to the shape of the anode connection protrusion 120 and the cathode connection protrusion 220 that are to be accommodated. Also, the sizes of the anode connection protrusion seating unit 740 and the cathode connection protrusion seating unit 750 may be determined according to the sizes of the anode connection protrusion 120 and the cathode connection protrusion 220 that are to be accommodated.

According to an embodiment, the anode guide seating unit 710, the cathode guide seating unit 720, the separator guide seating unit 730, the anode connection protrusion seating unit 740, and the cathode connection protrusion seating unit 750 may be arranged to be separated from each other by a predetermined distance along a circumference of the support seating unit 700. Accordingly, the anode guide seating unit 710, the cathode guide seating unit 720, the separator guide seating unit 730, the anode connection protrusion seating unit 740, and the cathode connection protrusion seating unit 750 may be arranged so as not to interfere with each other along the circumference of the support seating unit 700.

Figure 8B:
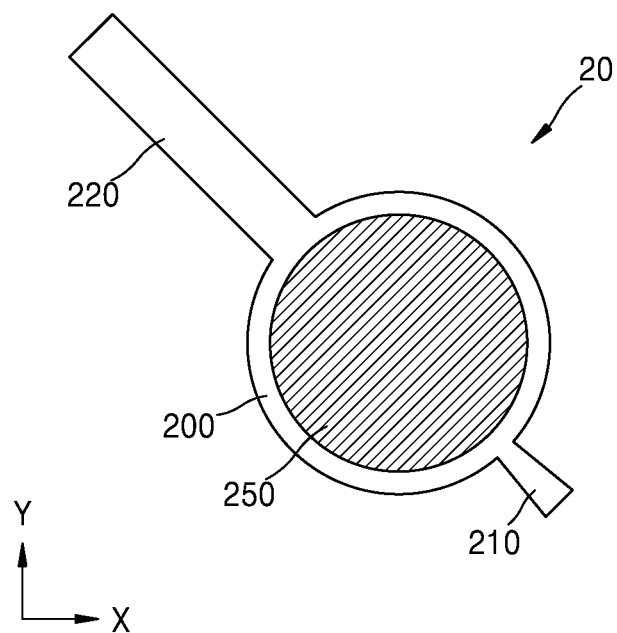

Referring to FIG. 8B, a second operation in which the cathode 20 is arranged so that the cathode guide 210 is accommodated in the cathode guide seating unit 720 according to an embodiment may be performed. According to an embodiment, in order to stack the cathode 20, the cathode active material support 200 may be arranged in the support seating unit 700, the cathode guide 210 may be arranged in the cathode guide seating unit 720, and the cathode connection protrusion 220 may be arranged in the cathode connection protrusion seating unit 750. The anode active material support 100 and the separator 30 may be accommodated in the support seating unit 700 in which the cathode active material support 200 is accommodated, and the size and shape of the support seating unit 700 may correspond to the cathode active material support 200. The cathode guide 210 is seated on the cathode guide seating unit 720 having a shape and size corresponding the cathode guide 210, and thus, the position of the cathode active material support 200 in the support seating unit 700 may be aligned, e.g., the cathode active material support 200 may be correctly seated in the support seating unit 700.

Figure 8C:
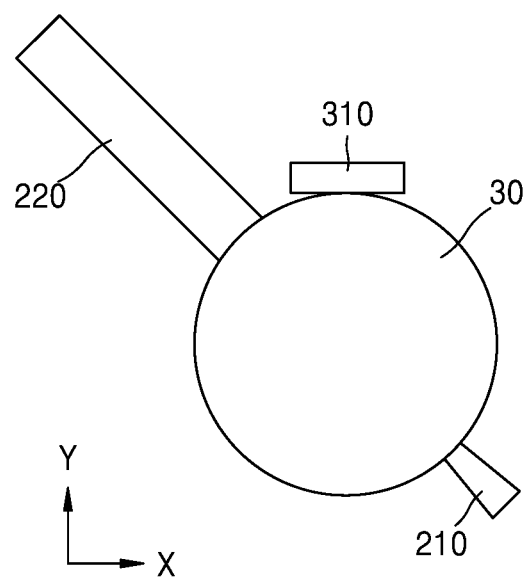

Referring to FIG. 8C, a third operation in which the separator 30 is arranged so that the separator guide 310 is accommodated in the separator guide seating unit 730 according to an embodiment may be performed. According to an embodiment, in order to stack the separator 30 on the cathode 20, the separator 30 may be arranged in the support seating unit 700 and the separator guide 310 may be arranged in the separator guide seating unit 730. The separator guide 310 may be seated in the separator guide seating unit 730 having a shape and size corresponding the separator guide 310, and the position of the separator 30 in the support seating unit 700 may be aligned, e.g., the separator 30 may be correctly seated in the support seating unit 700.

Figure 8D:
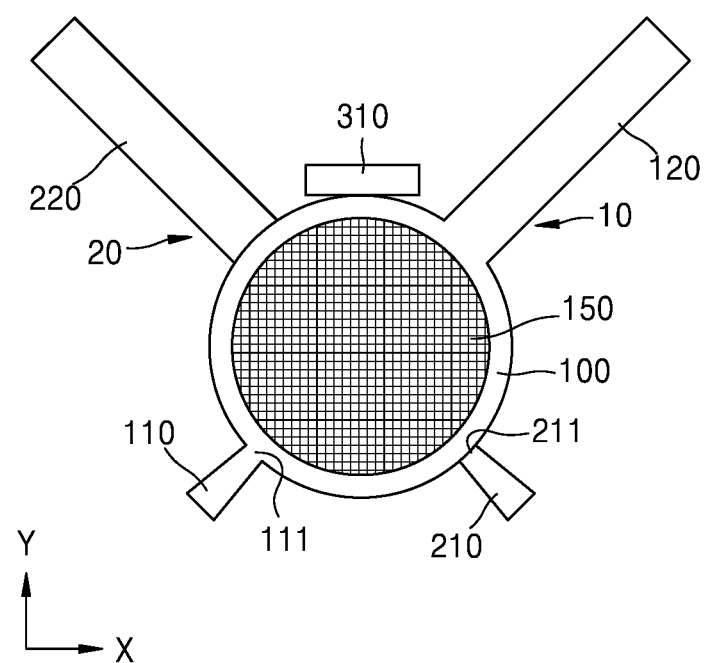

Referring to FIG. 8D, a fourth operation in which the anode 10 is arranged so that the anode guide 110 is accommodated in the anode guide seating unit 710 according to an embodiment may be performed. According to an embodiment, in order to stack the anode 10 on the separator 30, the anode active material support 100 may be arranged in the support seating unit 700, the anode guide 110 may be arranged in the anode guide seating unit 710, and the anode connection protrusion 120 may be arranged in the anode connection protrusion seating unit 740. The anode guide 110 is seated on the anode guide seating unit 710 having a shape and size corresponding the anode guide 210, and thus, the position of the anode active material support 100 in the support seating unit 700 may be aligned, e.g., the anode active material support 100 may be correctly seated in the support seating unit 700.

As described herein, the anode guide 110 and the cathode guide 210 may be seated on the anode guide seating unit 710 and the cathode guide seating unit 720 arranged at different positions along the circumference of the support seating unit 700. Accordingly, the anode guide 110 may extend from, e.g., be connected to, the first region 111 along the circumference of the anode active material support 100, and the cathode guide 210 may extend from, e.g., be connected to, the second region 211 along the circumference of the cathode active material support 200. The first region 111 and the second region 211 are arranged at different positions, and interference that may occur between the anode guide 110 and the cathode guide 210 may be prevented.

Figure 8E:
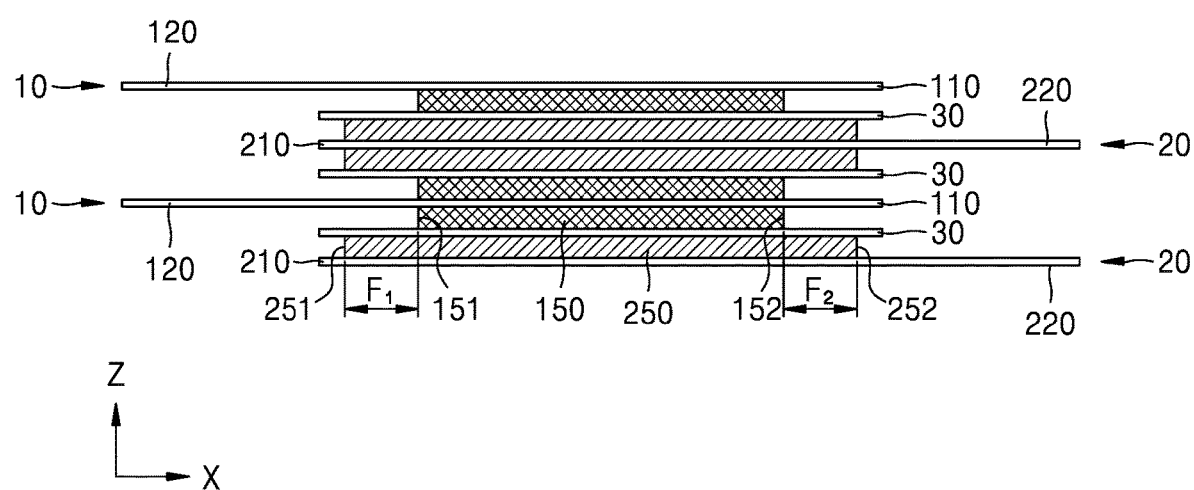

Referring to FIG. 8E, two or more of the second to fourth operations according to an embodiment may be repeatedly performed two or more times. As an example, the cathode 20, the separator 30, and the anode 10 may be sequentially stacked, the separator 30 and the cathode 20 may then be stacked, and the separator 30 and the anode 10 may then be stacked. On the cathode 20 arranged at a lowermost end of the stack or an uppermost end of the stack, the cathode active material 250 may be coated on a surface of the cathode active material support 200, and on the cathode 20 arranged in a central, e.g., intermediate, region of the stack, the cathode active material 250 may be coated on both surfaces of the cathode active material support 200. Also, on the positive electrode 10 disposed at the uppermost end of the stack or the lowermost end of the stack, the anode active material 150 may be coated on a surface of the anode active material support 100, and on the anode 10 arranged in a central, e.g., intermediate, region of the stack, the anode active material 150 may be coated on both surfaces of the anode active material support 100.

As depicted in FIG. 8E, in order to stably occlude lithium ions released from the anode 10, a coating area of the cathode active material 250 on the cathode active material support 200 may be greater than the coating area of the anode active material 150 on the anode active material support 100. When the coating area of the anode active material 150 is aligned so as to deviate from the coating area of the cathode active material 250, lithium ions released from the anode 10 may be non-uniformly transferred to the cathode 20. Accordingly, the coating area of the anode active material 150 and the coating area of the cathode active material 250 are desirably aligned.

As described herein, an alignment between the coating area of the anode active material 150 and the coating area of the cathode active material 250 may be achieved by using the anode guide seating unit 710 and the cathode guide seating unit 720 provided in the stacking jig 70 and the anode guide 110 and the cathode guide 210 connected to the anode 10 and the cathode 20. According to an embodiment, when alignment between the coating area of the anode active material 150 and the coating area of the cathode active material 250 is achieved, an absolute value of a difference between a first radial distance $F_1$ between a first end 251 of the cathode active material 250 and a first end 151 of the anode active material 150, e.g., the first end 151 of the anode active material 150 being an end of the anode active material 150 closest to the first end 251 of the cathode active material 250, and a second radial distance $F_2$ between a second end 252 of the cathode active material 250 and a second end 152 of the anode active material 150, e.g., the second end 152 of the anode active material 150 being an end of the anode active material 150 closest to the second end 252 of the cathode active material 250, may be 10 μm or more and 100 μm or less.

Figure 8F:
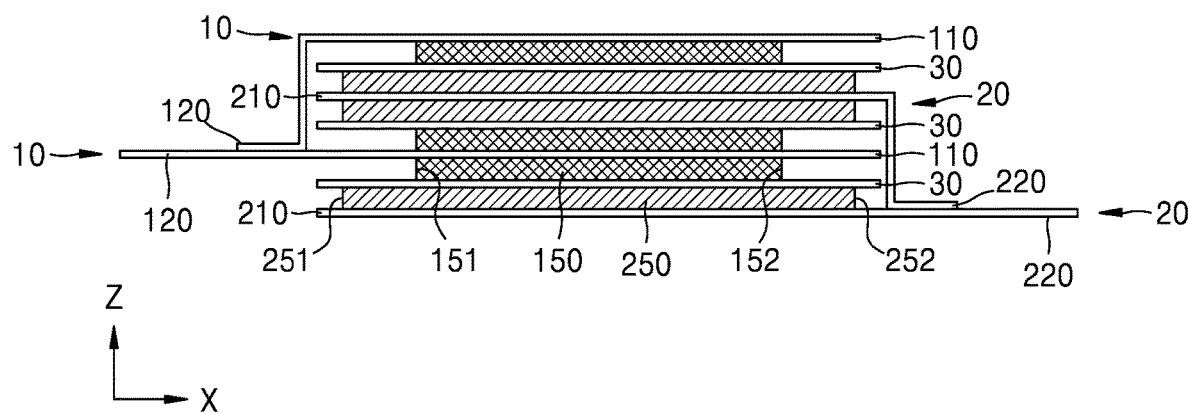

Referring to FIG. 8F, a plurality of anode connection protrusions 120 attached to a plurality of anodes 10 according to an embodiment may be connected to each other, and a plurality of cathode connection protrusions 220 attached to the plurality of cathodes 20 may be connected to each other. As an example, when the plurality of anodes 10 are arranged to be stacked, a connection member capable of electrically connecting the plurality of anodes 10 to each other is required. According to an embodiment, the plurality of anodes 10 may be electrically connected to each other by connecting the plurality of anode connection protrusions 120 attached to the plurality of anodes 10 to contact each other. Also, the plurality of cathodes 20 may be electrically connected to each other by connecting the plurality of cathode connection protrusions 220 attached to the plurality of cathodes 20 to contact each other. The plurality of anode connection protrusions 120 and the plurality of cathode connection protrusions 220 may be arranged to be separated from each other by a predetermined distance so as not to electrically contact each other.

Figure 8G:
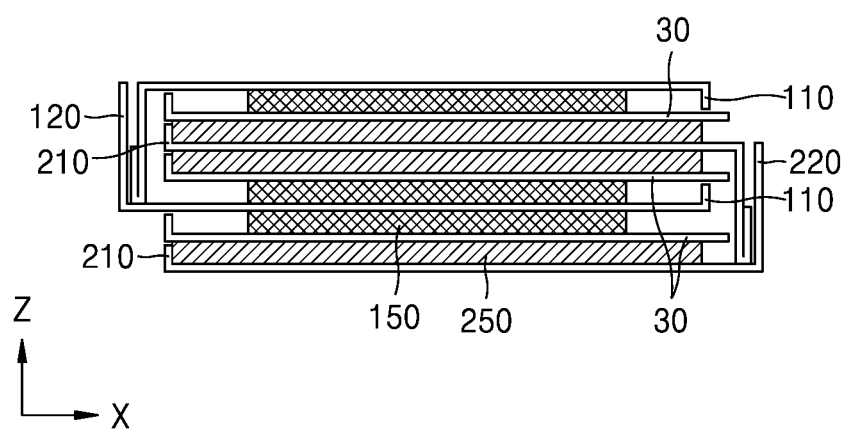

Referring to FIG. 8G, the anode guide 110, the cathode guide 210, the separator guide 310, the plurality of anode connection protrusions 120, and the plurality of cathode connection protrusions 220 according to an embodiment may be bent. As an example, the plurality of stacked anodes 10, cathodes 20, and separators 30 may be accommodated in the anode can 61 and cathode can 62 shown in FIG. 1. Accordingly, the extra anode guide 110, the cathode guide 210, the separator guide 310, the plurality of anode connection protrusions 120, and the plurality of cathode connection protrusions 220 outside the coating area of the anode active material 150 and the cathode active material 250 may be bent in the stacking direction (the Z-direction). Insulating units (not shown) may be arranged at ends of the plurality of anode connection protrusions 120 and the plurality of cathode connection protrusions 220, and thus, the plurality of anode connection protrusions 120 and the plurality of cathode connection protrusions 220 may be insulated from each other.

Figure 8H:
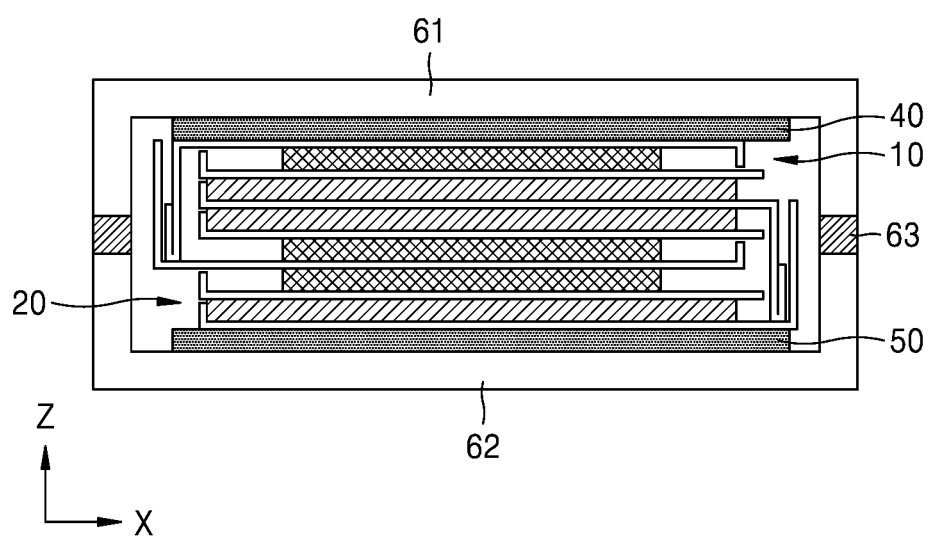

Referring to FIG. 8H, the plurality of anodes 10 according to an embodiment may be connected to the anode current collector 40, and the plurality of cathodes 20 may be connected to the cathode current collector 50. As an example, the anode current collector 40 may be arranged to be electrically connected to the anode 10 arranged at an uppermost end of the stack, and the cathode current collector 50 may be arranged to be electrically connected to the cathode 20 arranged at a lowermost end of the stack. The anode current collector 40 and the cathode current collector 50 may be defined as the uppermost end of the stack and the lowermost end of the stack, but the present disclosure is not limited thereto and may be arranged at any suitable positions. A plurality of electrode structures connected to the anode current collector 40 and the cathode current collector 50 are accommodated in the anode can 61 functioning as an anode terminal and a cathode can 62 functioning as a cathode terminal, and the gasket 63 may perform insulation and sealing functions by being arranged between the anode can 61 and the cathode can 62.

Although a secondary battery has been described with reference to an embodiment shown in the drawings, this is merely exemplary, and it will be understood by those skilled in the art that various modifications and equivalents are possible. Therefore, the true technical protection scope of the present invention will be defined by the technical spirit of the appended claims.

According to an embodiment of the present disclosure, a secondary battery in which an anode, a separator, and a cathode are sequentially stacked and a method of manufacturing the secondary battery may be provided.

Also, a secondary battery with improved alignment of a plurality of anodes, separators, and cathodes, and a method of manufacturing the secondary battery may be provided.

Also, a secondary battery with improved convenience in a manufacturing process in which a plurality of anodes, separators, and cathodes are stacked and a method of manufacturing the secondary battery may be provided.

Also, a secondary battery with increased charge/discharge reproducibility and energy density and a method of manufacturing the secondary battery may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A secondary battery comprising:
   an anode comprising an anode active material on an anode active material support;
   a cathode comprising a cathode active material on a cathode active material support;
   a separator between the anode and the cathode;
   an anode guide extending in a first direction from a first region along an edge of the anode active material support;
   a cathode guide extending in a second direction from a second region along an edge of the cathode active material support;
   an anode connection protrusion extending in a third direction from a third region along the edge of the anode active material support; and
   a cathode connection protrusion extending in a fourth direction from a fourth region along the edge of the cathode active material support.

2. The secondary battery of claim 1, wherein
   the first direction and the second direction are different; and
   the first region and the second region are non-overlapping.

3. The secondary battery of claim 1, wherein an absolute value of a difference between
   a first radial distance between a first end of the cathode active material and a first end of the anode active material, the first end of the anode active material being an end of the anode active material closest to the first end of the cathode active material, and
   a second radial distance between a second end of the cathode active material and a second end of the anode active material, the second end of the anode active material being an end of the anode active material closest to the second end of the cathode active material,
   is about 10 micrometers to about 100 micrometers.

4. The secondary battery of claim 1, wherein a width of the anode guide decreases in a direction from an end of the anode guide toward the anode active material support.

5. The secondary battery of claim 1, wherein
   the first direction and the third direction are opposite directions.

6. The secondary battery of claim 1, wherein
   the first direction and the third direction are not a same direction or opposite directions.

7. The secondary battery of claim 1, comprising
a plurality of the anode guides,
wherein each anode guide of the plurality of anode guides is arranged so as to be separated from each other.

8. The secondary battery of claim 6, wherein the anode active material support, the anode guide, and the anode connection protrusion each has a plate shape and comprise a conductive material.

9. The secondary battery of claim 1, wherein
the anode guide has a length that is about 2% to about 20% of a diameter of the anode active material support, and
the anode guide has a width that is about 2% to about 20% of the diameter of the anode active material support.

10. The secondary battery of claim 1, wherein a width of the cathode guide decreases in a direction from an end of the cathode guide toward the cathode active material support.

11. The secondary battery of claim 1, wherein
the second direction and the fourth direction are opposite directions.

12. The secondary battery of claim 1, wherein
the second direction and the fourth direction are not a same direction or opposite directions.

13. The secondary battery of claim 1, comprising
a plurality of the cathode guides, and
wherein each cathode guide of the plurality of cathode guides is arranged so as to be separated from each other.

14. The secondary battery of claim 12, wherein the cathode active material support, the cathode guide, and the cathode connection protrusion each has a plate shape and comprises a conductive material.

15. The secondary battery of claim 1, wherein
the cathode guide has a length that is about 2% to about 20% of a diameter of the cathode active material support, and
the cathode guide has a width that is about 2% to about 20% of the diameter of the cathode active material support.

16. The secondary battery of claim 1, further comprising a separator comprising a separator guide extending in a fifth direction from a region along an edge of the separator.

17. The secondary battery of claim 1, wherein
the anode, cathode, and separator form a stack; and
the second battery further comprises
an anode current collector electrically connected to the anode and arranged at a first end of the stack, and
a cathode current collector electrically connected to the cathode and arranged at a second end of the stack, the second end of the stack being opposite the first end of the stack.

18. The secondary battery of claim 1, wherein
the anode active material support has a circular shape,
the cathode active material support has a circular shape,
the first region is along a circumference of the anode active material support; and
the second region is along a circumference of the cathode active material support.

19. A secondary battery comprising:
a plurality of anodes stacked in a stacking direction, the plurality of anodes comprising
anode connection protrusions electrically connecting the plurality of anodes, the anode connection protrusions being bent in a first direction or opposite the first direction, and
anode guides bent in the first direction or opposite the first direction;
a plurality of cathodes stacked in the stacking direction, the plurality of cathodes comprising
cathode connection protrusions electrically connecting the plurality of cathodes, the cathode connection protrusions being bent in the first direction or opposite the first direction, and
cathode guides bent in the first direction or opposite the first direction;
a plurality of separators between the plurality of anodes and the plurality of cathodes;
a cathode current collector electrically connected to the cathode connection protrusions;
an anode current collector electrically connected to anode connection protrusions;
an anode terminal electrically connected to the anode current collector; and
a cathode terminal electrically connected to the cathode current collector.

* * * * *